April 21, 1953   S. D. ROSS   2,636,006
STABILIZATION OF HALOGENATED COMPOUNDS
Filed May 26, 1948
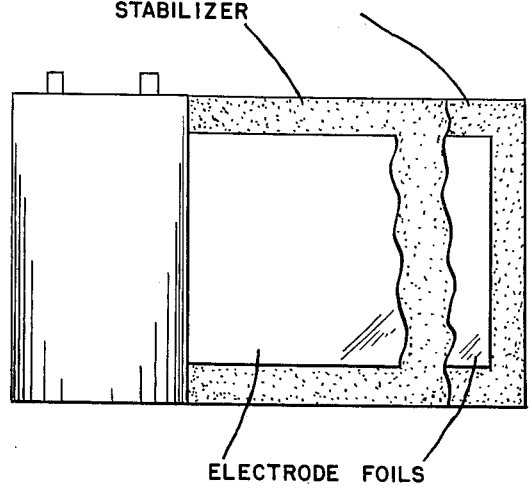
SPACERS IMPREGNATED WITH DIELECTRIC COMPOSITION, INCLUDING HALOGENATED ORGANIC COMPOUND AND A NITROSAMINE OR NITROSO STABILIZER
ELECTRODE FOILS
SIDNEY D. ROSS
*INVENTOR.*
BY *Arthur G. Connolly*
*his attorney*

Patented Apr. 21, 1953

2,636,006

UNITED STATES PATENT OFFICE 2,636,006

STABILIZATION OF HALOGENATED COMPOUNDS

Sidney D. Ross, North Adams, Mass., assignor to Sprague Electric Company, North Adams, Mass., a corporation of Massachusetts Application May 26, 1948, Serial No. 29,305

7 Claims. (Cl. 252—63.7)

My invention relates to the stabilization of halogenated organic compounds. More particularly, it concerns dielectric compositions composed of such halogenated compounds to which relatively small amounts of certain stabilizing agents have been added. It also concerns electrical devices, especially capacitors, in which metal conductors are insulated with such dielectric compositions.

Halogenated organic compounds, such as chlorinated diphenyl and chlorinated naphthalene, are known to be very useful electrical insulating materials, because of their relatively high thermal stability, resistance to oxidation, low conductivity, non-inflammability and other valuable properties. The two halogenated aromatic compounds specifically mentioned above are widely used commercially as dielectric materials for various electrical devices, particularly as impregnants in electrical capacitors. Unfortunately, dielectric compositions containing such halogenated compounds often deteriorate at a relatively high rate, particularly when exposed to elevated temperatures, high electrical stresses, or both. This deterioration may be noted as an increase in the leakage current of direct current capacitors or as an increase in the power factor of alternating current capacitors. The deterioration ultimately results in the complete breakdown of the dielectric and a resultant short circuit of the capacitor or other electrical device.

To overcome this instability of the halogenated organic compounds or to minimize the deleterious effects thereof, a number of so-called stabilizers have been proposed. These include a wide variety of inorganic and organic chemicals that are more or less effective for their purpose.

In the case of electrical capacitors, the dielectric impregnant is in contact with the metal electrodes which are usually made of aluminum foils. If, during the deterioration of the chlorinated hydrocarbon, hydrogen chloride is evolved, it appears that aluminum chloride is produced by reaction of the acid with the metal of the foils. If aluminum chloride is formed, there are, of course, many further reactions that may ensue, which destroy the dielectric properties of the insulating material. Thus the so-called stabilizer must be particularly effective in the presence of such metals as are customarily employed in electrical devices.

It is an object of the present invention to overcome the foregoing and related disadvantages of the halogenated dielectric materials. A further object is to improve the performance of halogenated aromatic insulating compounds. A still further object is to produce electrical capacitors impregnated with halogen containing dielectric materials, which capacitors are stable under high temperatures and electrical stresses.

These objects are attained in accordance with the present invention by adding to the halogenated dielectric material a small proportion of a compound selected from the class consisting of organic nitrosamine or nitroso compounds. In a more restricted sense this invention is concerned with an electrical capacitor comprising aluminum electrodes separated by a porous dielectric substance impregnated with a chlorinated aromatic hydrocarbon admixed with a small proportion of an organic nitroso compound. In its preferred embodiments the invention is concerned with a chlorinated naphthalene having dissolved therein a small proportion of an organic nitroso compound, and a chlorinated diphenyl having dissolved therein a small proportion of an organic nitroso compound. In one of its limited embodiments the invention is concerned with a chlorinated naphthalene having dissolved therein a small proportion of N-nitroso diphenylamine.

According to my invention I have found that halogenated organic compounds, particularly the chlorinated aromatic compounds, may be rendered stable in the presence of metal under conditions of high temperature and electrical stress by treatment thereof with an organic nitrosamine or nitroso compound. I have found that the deterioration to which the halogenated compounds are normally subject is substantially entirely prevented by the inclusion of a relatively small amount of organic nitroso compounds in which the nitroso group is attached to a carbon atom or a nitrogen atom. While I am not fully aware of the reason therefor, it appears that the nitroso compound inhibits the initial reaction of any deterioration products, thus preventing this reaction from proceeding normally and, of course, eliminating subsequent reactions made possible by completion of the initial reaction. In any event, my invention makes possible the use of chlorinated aromatic compounds and other halogenated compounds in electrical capacitors, transformers, circuit breakers and related devices in which the instability of such compounds has heretofore discouraged their use.

Among the nitroso compounds which I have found to be effective in accordance with my invention are those in which the nitroso group is attached to a nitrogen atom. Representative compounds within this category are N-nitrosodiphenylamine, nitrosopiperidine, nitrosodiethylamine, and nitrosodimethylamine.

Among the compounds in which the nitroso group is attached to a carbon atom, I have found p-nitrosodimethylaniline and p-nitrosodiphenylamine to be effective. Other nitroso compounds falling in this group are:

1-nitroso-2-naphthol
2-nitroso-1-naphthol
1-nitroso-2-aminonaphthalene
nitrosobenzene
nitrosophenol
nitrosoaniline
2-nitroso-3-chloro-2,3-dimethylbutane The invention finds particular use in the manufacture of electrical capacitors impregnated with chlorinated naphthalene or chlorinated diphenyl. The former is a wax-like solid melting at 95° C., and the latter is a very viscous liquid, both compounds containing between about 50% and about 60% of chlorine. The nitroso and nitrosamine compounds of the invention are advisably dissolved therein in an amount between about 0.1% and 5% and preferably within the range of 0.5% to about 2%. While the lower molecular weight nitroso or nitrosamine compounds need not be added in as large proportions, these are less practical, because of their lower boiling points and the possible loss in processing. The particular amount that should be added is dependent upon several factors, such as the temperature and pressure of processing of the impregnant and the temperature of operation of the finished capacitor.

Reference may be made to the appended drawing which shows a capacitor of the rolled type to which the present invention is applicable. It is made up of two thin aluminum foils separated by a porous dielectric spacing material, such as kraft paper, which is impregnated with a halogenated compound containing the nitrosamine or nitroso organic compounds of the invention, the interleaved sheets being rolled into the form shown in the drawing.

Representative electrical capacitors have been produced with two aluminum foils separated by sheets of calendered kraft paper with a total thickness of .0009″. These have been impregnated with chlorinated naphthalene wax containing 2% paraffin to produce units rated at 400 volts D. C. continuous operation. Life tests conducted at 65° C. and 85° C. at one and one-half times the rated voltage, e. g. 600 volts, result in failure of over 30% of the condensers at 65° C. within 500 hours and over 80% of the condensers at 85° C. within 500 hours. In contrast two sets of identical condensers impregnated with chlorinated naphthalene wax containing 0.5% and 1.0% N-nitrosodiphenylamine in addition to 2% paraffin were operated at 600 volts for over 500 hours at 85° C. without any failure.

The Radio Manufacturer's Association Specification 159B for non-metal encased D. C. tubular condensers calls for 250 hours at 1.5 times rated voltage at 85° C. without failure and the condensers of the invention (described above) meet this specification.

Percentages of 0.5% to 2.0% have been found very effective, and the inhibition or stabilizing action is apparent at concentrations of 0.1% or even less.

While the above description has been particularly concerned with electrical capacitors, it has been found that the inhibition or stabilizing action described herein is applicable to other electrical devices, particularly those subjected to high voltages and temperatures.

It is contemplated that the stabilizers of my invention may be added to halogenated aliphatic hydrocarbons, halogenated alicyclic hydrocarbons, halogenated aromatic ethers, halogenated oxygen containing heterocycles and to other halogen containing compounds which display a tendency to deteriorate under exposure to high temperature and/or high electrical stress.

The solubility of the compounds described above in the halogenated compounds, particularly halogenated aromatic hydrocarbons, is satisfactory, and for practical purposes it is usually desirable to incorporate the nitroso compounds in the dieletcric impregnants prior to impregnation into the capacitor. However, if so desired, the nitroso compounds may be introduced into the dielectric spacer material prior to impregnation, or even coated onto the metal electrode foils.

As many different embodiments of this invention may be made without departing from the spirit and scope hereof, it is to be understood that the invention is not limited to the specific embodiments hereof except as defined in the appended claims.

What I claim is:

1. A halogenated aromatic compound admixed with a small proportion of an organic nitroso compound in which the nitroso group is attached to an element selected from the class consisting of carbon and nitrogen atoms, the amount of nitroso compound present being sufficient to stabilize the halogenated compound against deterioration in the presence of metal under conditions of high temperature and electrical stress.

2. A chlorinated naphthalene having dissolved therein between about 0.1% and about 5% by weight of an organic nitroso compound in which the nitroso group is attached to an element selected from the class consisting of carbon and nitrogen atoms.

3. A chlorinated diphenyl having dissolved therein between about 0.1% and about 5% by weight of an organic nitroso compound in which the nitroso group is attached to an element selected from the class consisting of carbon and nitrogen atoms.

4. A chlorinated naphthalene having dissolved therein from 0.5% to 2% by weight of N-nitroso diphenylamine.

5. A chlorinated diphenyl having dissolved therein from 0.5% to 2% by weight of N-nitroso diphenylamine.

6. A chlorinated aryl hydrocarbon having dissolved therein from about 0.5% to about 2.0% by weight of an organic nitroso compound in which the nitroso group is attached to a nitrogen atom.

7. A chlorinated aryl hydrocarbon having dissolved therein from about 0.5% to about 2.0% by weight of N-nitroso-diphenylamine.

SIDNEY D. ROSS.

References Cited in the file of this patent

UNITED STATES PATENTS

| Number | Name | Date |
| --- | --- | --- |
| 2,077,429 | McMahon | Apr. 20, 1937 |
| 2,339,091 | McLean | Jan. 11, 1944 |
| 2,358,628 | Clark | Sept. 19, 1944 |
| 2,394,367 | Clark | Feb. 5, 1946 |
| 2,453,493 | Clark | Nov. 9, 1948 |